(12) United States Patent
Jackson et al.

(10) Patent No.: US 11,542,209 B2
(45) Date of Patent: Jan. 3, 2023

(54) ENVIRONMENTAL BARRIER COATING

(71) Applicant: UNITED TECHNOLOGIES CORPORATION, Farmington, CT (US)

(72) Inventors: Richard Wesley Jackson, Mystic, CT (US); Michael R. Kracum, Albuquerque, NM (US); Xia Tang, West Hartford, CT (US); James T. Beals, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 120 days.

(21) Appl. No.: 16/785,085

(22) Filed: Feb. 7, 2020

(65) Prior Publication Data

US 2021/0246082 A1 Aug. 12, 2021

(51) Int. Cl.
*B32B 9/04* (2006.01)
*C04B 41/50* (2006.01)
(Continued)

(52) U.S. Cl.
CPC ...... *C04B 41/5022* (2013.01); *C04B 41/4539* (2013.01); *C04B 41/522* (2013.01); *C04B 41/86* (2013.01); *C04B 41/89* (2013.01); *F01D 5/284* (2013.01); *F01D 5/288* (2013.01); *F05B 2220/30* (2013.01); *F05B 2230/90* (2013.01);
(Continued)

(58) Field of Classification Search
CPC ............ C04B 41/5022; C04B 41/4539; C04B 41/522; C04B 41/86; C04B 41/89; C04B 41/009; C04B 41/5035; C04B 41/5089; C04B 41/85; F01D 5/284; F01D 5/288; F05B 2220/30; F05B 2230/90;
(Continued)

(56) References Cited

U.S. PATENT DOCUMENTS

2010/0129673 A1   5/2010  Lee
2016/0319135 A1  11/2016  Hecht
(Continued)

FOREIGN PATENT DOCUMENTS

WO  2015147960        10/2015
WO  2018126816 A1   11/2018

OTHER PUBLICATIONS

Jiang et al. "Fabrication of barium-strontium aluminosilicate coatings on C/SiC composites via laser cladding", 2017, Journal of Materials Science and Technology, 33(2), p. 166-171. (Year: 2017).*
(Continued)

*Primary Examiner* — Seth Dumbris
(74) *Attorney, Agent, or Firm* — Carlson, Gaskey & Olds, P.C.

(57) ABSTRACT

An article includes a ceramic-based substrate and a barrier layer on the ceramic-based substrate. The barrier layer includes a matrix phase and gettering particles in the matrix phase. The gettering particles with an aspect ratio greater than one are aligned such that a maximum dimension of the gettering particles extends along an axis that is generally parallel to the substrate. The barrier layer includes a dispersion of diffusive particles in the matrix phase. A composite material and a method of applying a barrier layer to a substrate are also disclosed.

16 Claims, 3 Drawing Sheets

(51) Int. Cl.
  *C04B 41/45* (2006.01)
  *C04B 41/52* (2006.01)
  *C04B 41/86* (2006.01)
  *C04B 41/89* (2006.01)
  *F01D 5/28* (2006.01)

(52) U.S. Cl.
  CPC ... *F05C 2253/12* (2013.01); *Y10T 428/12493* (2015.01); *Y10T 428/12611* (2015.01)

(58) Field of Classification Search
  CPC .......... F05C 2253/12; F05D 2300/211; F05D 2300/6033
  USPC .......... 428/446, 615, 632; 427/374.7, 376.2, 427/397.7; 60/753
  See application file for complete search history.

(56) References Cited

U.S. PATENT DOCUMENTS

| | | |
|---|---|---|
| 2016/0332922 A1* | 11/2016 | Tang ................ C04B 35/14 |
| 2017/0113976 A1 | 4/2017 | Shim et al. |
| 2017/0121232 A1 | 5/2017 | Nelson et al. |
| 2020/0010375 A1 | 1/2020 | Tang et al. |
| 2020/0062664 A1 | 2/2020 | Tang et al. |

OTHER PUBLICATIONS

European Search Report for European Patent Application No. 21155327.6 dated Jun. 1, 20218.

\* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a ceramic-based substrate and a barrier layer on the ceramic-based substrate. The barrier layer includes a matrix phase and gettering particles in the matrix phase. The gettering particles with an aspect ratio greater than one are aligned such that a maximum dimension of the gettering particles extends along an axis that is generally parallel to the substrate. The barrier layer includes a dispersion of diffusive particles in the matrix phase.

In a further example of the foregoing, the diffusive particles include at least one of barium-magnesium alumino-silicate particles, barium strontium aluminum silicate particles, magnesium silicate particles, alkaline earth aluminum silicate particles, yttrium aluminum silicate particles, ytterbium aluminum silicate particles, and rare earth metal aluminum silicate particles.

In a further example of any of the foregoing, the gettering particles include at least one of silicon oxycarbide (SiOC) particles, silicon carbide (SiC) particles, silicon nitride ($Si_3N_4$) particles, silicon oxycarbonitride (SiOCN) particles, silicon aluminum oxynitride (SiAlON) particles, and silicon boron oxycarbonitride (SiBOCN) particles.

In a further example of any of the foregoing, the gettering particles are silicon oxycarbide particles, and the diffusive particles are barium-magnesium alumino-silicate particles.

In a further example of any of the foregoing, the barium-magnesium alumino-silicate particles have an average maximum dimension that is smaller than an average maximum dimension of the silicon oxycarbide particles.

In a further example of any of the foregoing, at least 50% of the gettering particles have an aspect ratio greater than one.

In a further example of any of the foregoing, at least 25% of the gettering particles have an aspect ratio greater than three.

In a further example of any of the foregoing, the article comprises a distinct intermediate layer between the barrier layer and the ceramic-based substrate. The distinct intermediate layer includes an intermediate layer matrix of and a dispersion of intermediate layer gettering particles in the intermediate layer matrix.

In a further example of any of the foregoing, the article comprises a ceramic-based top coat on the barrier layer.

A composite material according to an exemplary embodiment of this disclosure, among other possible things includes a matrix of $SiO2$, a dispersion of gettering particles in the matrix, and a dispersion of diffusive particles in the matrix. At least 50% of the gettering particles have an aspect ratio greater than one and at least 25% of the gettering particles have an aspect ratio greater than three.

In a further example of the foregoing, the gettering particles include at least one of oxycarbide (SiOC) particles, silicon carbide (SiC) particles, and silicon nitride ($Si_3N_4$) particles, silicon oxycarbonitride (SiOCN) particles, silicon aluminum oxynitride (SiAlON) particles, and silicon boron oxycarbonitride (SiBOCN) particles, and wherein the diffusive particles include at least one of barium-magnesium alumino-silicate particles, barium strontium aluminum silicate particles, magnesium silicate particles, alkaline earth aluminum silicate particles, yttrium aluminum silicate particles, and ytterbium aluminum silicate particles.

In a further example of any of the foregoing, the gettering particles are silicon oxycarbide particles and the diffusive particles are barium-magnesium alumino-silicate particles.

In a further example of any of the foregoing, the gettering particles are reactive with respect to oxidant particles. The oxidant particles include at least one of water and oxygen.

In a further example of any of the foregoing, the gettering particles are reactive with respect to oxidant particles.

In a further example of any of the foregoing, the gettering particles with an aspect ratio greater than one are aligned such that a maximum dimension of the gettering particles extends along an axis that is generally perpendicular to a thickness dimension of the composite material.

A method of applying a barrier layer to a substrate according to an exemplary embodiment of this disclosure, among other possible things includes mixing diffusive particles, gettering particles, and matrix material in a carrier fluid to form a slurry. At least a portion of the gettering particles have a first dimension and a second dimension defined perpendicular to the first dimension. the portion includes at least 50% of the gettering particles. The method includes applying the slurry to a substrate, aligning the portion of the gettering particles such that the first dimension of the gettering particles extends along an axis that is generally parallel to the substrate, and curing the slurry.

In a further example of the foregoing, the aligning is performed while the slurry is in an uncured or partially cured state.

In a further example of any of the foregoing, the aligning includes heating or cooling the slurry.

In a further example of any of the foregoing, the applying includes forming the slurry into one of more tapes with a binder material and applying the one more tapes to the substrate.

In a further example of any of the foregoing, the curing includes removing the binder material.

DETAILED DESCRIPTION

Figure 1:
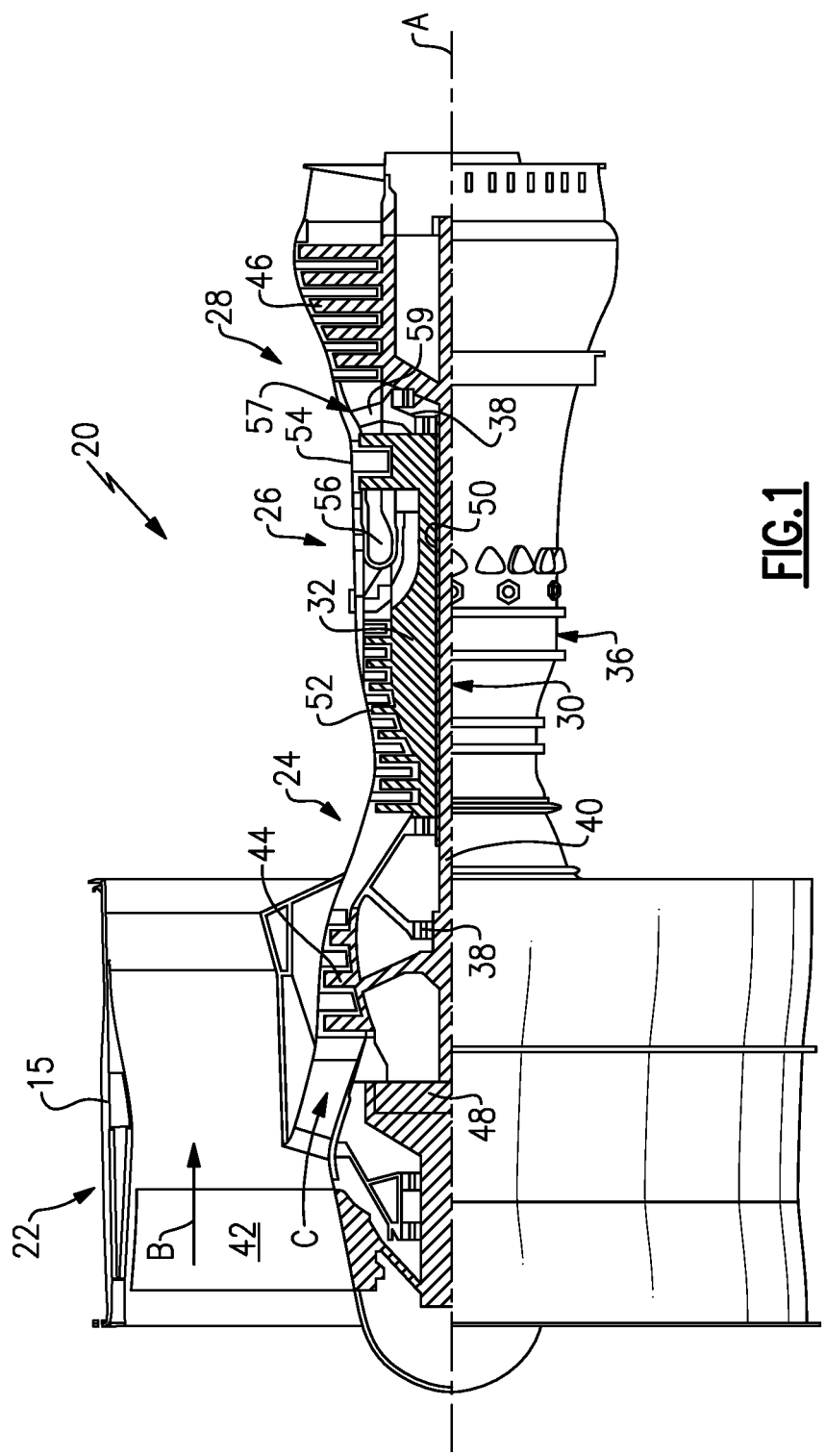
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/ (518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades in the fan section 22 disclose an example gas turbine engine 20 with increased power transfer efficiency.

Figure 2A:
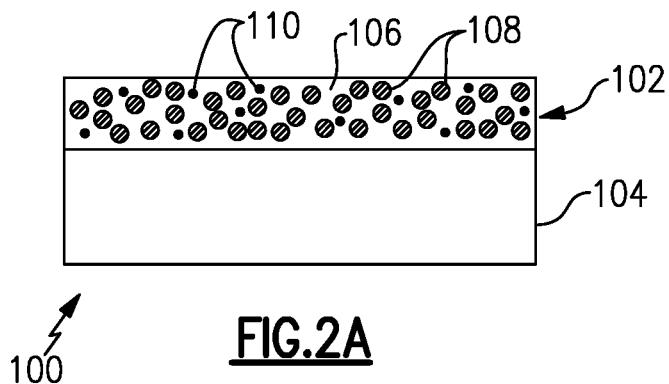
FIG. 2A illustrates an example article having a barrier layer of a composite material that includes gettering particles and diffusive particles.

FIG. 2A schematically illustrates a representative portion of an example article 100 for the gas turbine engine 20 that includes a composite material 102 that is used as a barrier layer. The article 100 can be, for example, an airfoil in the compressor section 24 or turbine section 28, a combustor liner panel in the combustor section 26, a blade outer air seal, or other component that would benefit from the examples herein. In this example, the composite material 102 is used as an environmental barrier layer to protect an underlying substrate 104 from environmental conditions, as well as thermal conditions. As will be appreciated, the composite material 102 can be used as a stand-alone barrier layer, as an outermost/top coat with additional underlying layers, or in combination with other coating under- or over-layers, such as, but not limited to, ceramic-based topcoats.

The composite material 102 includes a matrix of silicon dioxide ($SiO_2$) 106, a dispersion of "gettering" particles, and a dispersion of diffusive particles. In one example, the gettering particles are silicon oxycarbide particles (SiOC) 108 and the diffusive particles are barium-magnesium alumino-silicate particles 110 ("BMAS particles"), though other examples are contemplated. The gettering particles 108 could be, for instance, silicon oxycarbide (SiOC) particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, BMAS particles, barium strontium aluminum silicate particles, magnesium silicate particles, alkaline earth aluminum silicate particles, yttrium aluminum silicate particles, ytterbium aluminum silicate particles, other rare earth metal aluminum silicate particles, or combinations thereof.

Figure 2B:
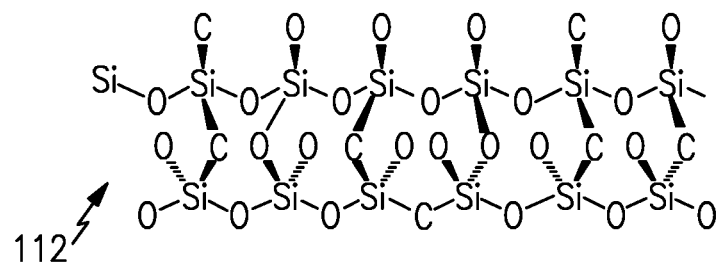
FIG. 2B illustrates a network of silicon oxycarbide.

The gettering particles 108 may form a network within the matrix 106. For instance, silicon oxycarbide particles 108 have silicon, oxygen, and carbon in a covalently bonded network, as shown in the example network 112 in FIG. 2B. The network 112 is amorphous and thus does not have long range crystalline structure. The illustrated network 112 is merely one example in which at least a portion of the silicon atoms are bonded to both O atoms and C atoms. As can be appreciated, the bonding of the network 112 will vary depending upon the atomic ratios of the Si, C, and O. In one example, the silicon oxycarbide particles 108 have a composition $SiO_xM_zC_y$, where M is at least one metal, $x<2$, $y>0$, $z<1$, and x and z are non-zero. The metal can include aluminum, boron, transition metals, refractory metals, rare earth metals, alkaline earth metals or combinations thereof.

In one example, the composite material 102 includes, by volume, 1-30% of the diffusive particles 110. In a more particular example, the composite material 102 includes, by volume, 1-10% of diffusive particles 110. In a further example, the composite material 102 includes, by volume, 30-94% of the gettering particles 108. In a particular example, the composite material includes, by volume, 60-90% of the gettering particles 108. In one further example, the composite material 102 includes, by volume, 5-40% of the matrix 106. In a further example, the composite material 102 includes, by volume, 1-30% of the diffusive particles 110, 5-40% of the matrix 106, and a balance of the gettering particles 108.

The barrier layer protects the underlying substrate 104 from oxygen and moisture. For example, the substrate 104 can be a ceramic-based substrate, such as a silicon-containing ceramic material. One example is silicon carbide. Another non-limiting example is silicon carbide fibers in a silicon carbide matrix. The gettering particles 108 and the diffusive particles 110 of the barrier layer function as an oxygen and moisture diffusion barrier to limit the exposure of the underlying substrate 104 to oxygen and/or moisture from the surrounding environment. Without being bound by any particular theory, the diffusive particles 110 enhance oxidation and moisture protection by diffusing to the outer surface of the barrier layer opposite of the substrate 104 and forming a sealing layer that seals the underlying substrate 104 from oxygen/moisture exposure. Additionally, for BMAS particles, the cationic metal species of the BMAS particles 110 (barium, magnesium, and aluminum) can diffuse into the gettering particles 108 to enhance oxidation stability of the gettering particle 108 material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 are reactive with respect to oxidant particles, such as oxygen or water, that could diffuse into the barrier layer. In this way, the gettering particles could reduce the likelihood of those oxidant particles reaching and oxidizing the substrate 104.

Figure 3:
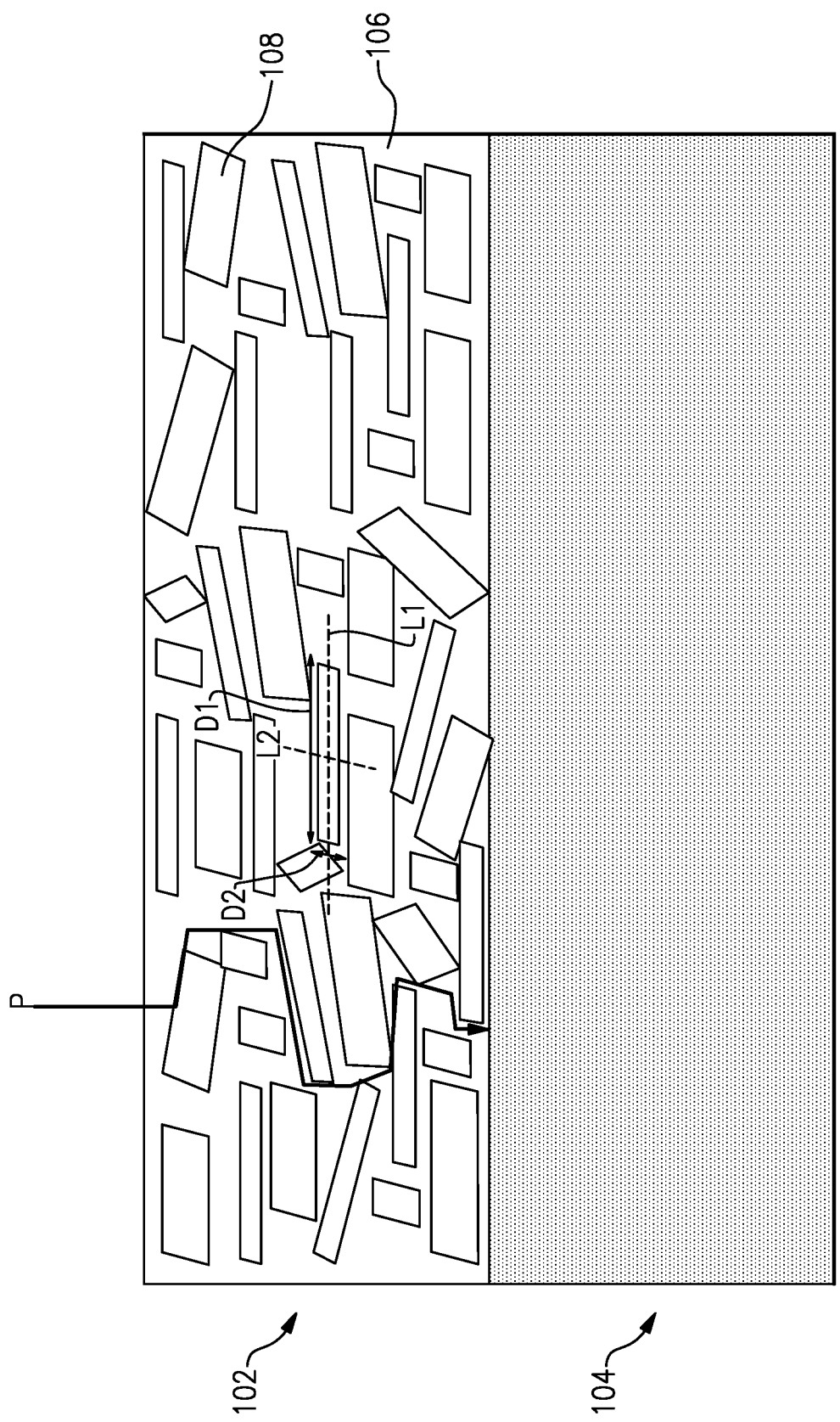
FIG. 3 illustrates an example barrier layer with oriented gettering particles.

In one example, shown in FIG. 3, at least some of the gettering particles 108 have an elongated shape, e.g., have an aspect ratio greater than one. The gettering particles 108 have a maximum dimension. Further, the gettering particles 108 have a dimension D1 that is defined along a first axis L1 of the gettering particles and a second dimension D2 that is defined along a second axis L2 generally perpendicular to the first axis. The dimensions D1 and D2 can be determined by any known imaging technique. L1 is defined as the axis closest to parallel to the interface of the composite material 102 and the substrate 104, while L2 is defined as the axis closest to perpendicular to the interface of the composite material 102 and the substrate 104. The aspect ratio, α, of the individual gettering particles 108 is defined as the ratio of a diameters $\alpha=D1/D2$. In a particular example, at least 50% of the gettering particles 108 have an aspect ratio greater than one and at least 25% of the gettering particles 108 have an aspect ratio greater than three.

Furthermore, an average aspect ratio for the gettering particles 108 in the barrier layer can be determined from a sample of individual gettering particles 108. In one example, the average aspect ratio of the gettering particles 108 is greater than one. In a further example, the average aspect ratio of the gettering particles 108 is between about 2 and 5.

In one example, the gettering particles 108 with an aspect ratio greater than one are aligned such that the axis L1 is generally parallel to the surface of the substrate 104 (e.g., generally perpendicular to a thickness dimension of the barrier layer). "Generally parallel" means that an angle between the axis L1 and the surface of the substrate 104 is less than about 20 degrees. "Generally perpendicular" means an angle between the axis L1 and the thickness dimension of the barrier layer is between about 70 and 110 degrees.

As shown in FIG. 3, oxidant particles that may diffuse into the barrier layer follow a path P. Due to the elongated shape of the gettering particles 108, the path is tortuous, and longer than a straight path, reducing the likelihood of the oxidant particles from reaching the substrate 104. Furthermore, the orientation of the gettering particles 108 increases the surface area of gettering particles 108 that faces the path P, increasing the effective surface area of gettering particles 108 for encountering and reacting with oxidant particles. This also reduces the likelihood that oxidant particles will reach the substrate 104. Also, the shape and orientation of the gettering particles 108 increases the packing efficiency of the gettering particles, which generally reduces the presence of areas with relatively large distances between adjacent gettering particles 108. This in turn reduces the presence of areas with reduced localized oxidation resistance promotes the formation of a more uniform barrier layer. For at least these reasons, the longevity and oxidation resistance of the barrier layer is improved by the shape and/or orientation of the gettering particles 108 described herein.

In one example, an average maximum dimension of the diffusive particles 110 is less than the average maximum dimension D1 of the gettering particles 108. In a particular example, the average maximum dimension D1 of the gettering particles 108 is between about 30 and 70 microns.

Figure 4:
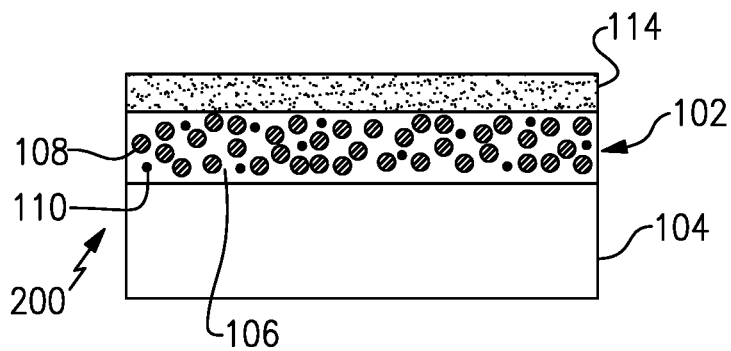
FIG. 4 illustrates another example article having a barrier layer of a composite material that includes gettering particles and diffusive particles.

FIG. 4 shows another example article 200 that includes the composite material 102 as a barrier layer arranged on the substrate 104. In this example, the article 200 additionally includes a ceramic-based top coat 114 interfaced with the barrier layer. As an example, the ceramic-based top coat 114 can include one or more layers of an oxide-based material. The oxide-based material can be, for instance, hafnium-based oxides, yttrium-based oxides (such as hafnia, hafnium silicate, yttrium silicate, yttria stabilized zirconia or gadolinia stabilized zirconia), or combinations thereof, but is not limited to such oxides.

Figure 5:
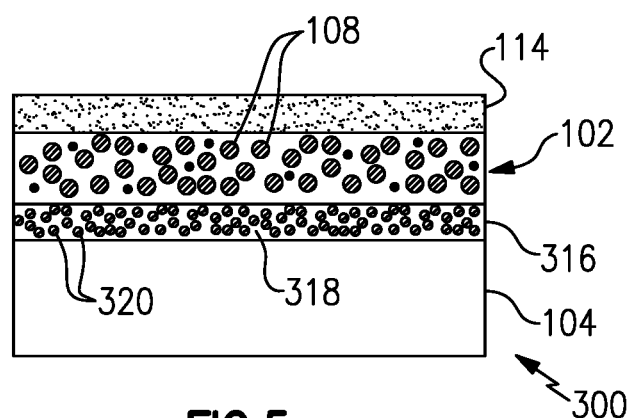
FIG. 5 illustrates another example article having a barrier layer of a composite material that includes gettering particles and diffusive particles.

FIG. 5 illustrates another example article 300 that is somewhat similar to the article 200 shown in FIG. 4 but includes a distinct intermediate layer 316 interposed between the barrier layer of the composite material 102 and the substrate 104. In this example, the distinct intermediate layer 316 includes an intermediate layer matrix 318 of silicon dioxide and a dispersion of intermediate layer gettering particles 320 in the intermediate layer matrix 318. The intermediate layer gettering particles 320 are similar to the gettering particles 108 in composition but, in this example, the intermediate layer silicon oxycarbide particles 320 have an average maximum dimension (D3) that is less than the average maximum dimension (D1) of the gettering particles 108. The gettering particles 320 maybe spherical or elongated in shape. The relatively small intermediate layer gettering particles 320 provide a relatively low roughness for enhanced bonding with the underlying substrate 104. The larger gettering particles 108 of the barrier layer provide enhanced blocking of oxygen/moisture diffusion. Thus, in combination, the barrier layer and intermediate layer 316 provide good adhesion and good oxidation/moisture resistance.

In one example, the intermediate layer 316 can include, by volume, 5-40% of the intermediate layer matrix 318 of silicon dioxide and a balance of the intermediate layer gettering particles 320. In further examples, a portion of the diffusive particles 110 from the barrier layer can penetrate or diffuse into the intermediate layer 316, during processing, during operation at high temperatures, or both. In a further example, a seal coat layer of $SiO_2$, with or without BMAS particles, can be provided between the barrier layer and the intermediate layer 316 to provided adhesion and additional sealing. In further examples of any of the compositions disclosed herein, said compositions can include only the listed constituents. Additionally, in any of the examples disclosed herein, the matrix 106 and 318 can be continuous. The two-layer structure can also demonstrate good oxidation protection at 2000-2700° F. for 500 hours or longer as well as good adhesion with the ceramic-based top coat 114.

The composite material 102 and/or intermediate layer 316 can be fabricated using a slurry coating method. The appropriate slurries can be prepared by mixing components, such as gettering particles, diffusive particles, and matrix material, such as powder of silicon dioxide or colloidal silica (Ludox) in a carrier fluid, such as water. The slurries can be mixed by agitation or ball milling and the resulting slurry can be deposited onto the underlying substrate 104. The slurry can then be partially cured by drying at room temperature or at an elevated temperature to remove the carrier fluid. In one example, the slurry is dried and cured at about 100-300° C. for about 5-60 minutes. During the heating, cross-linking of the colloidal silica in the matrix material occurs. The green coating can then be fully cured by sintered at an elevated temperature in air for a selected amount of time. In one example, the sintering includes heating at 1500° C. or greater in an air environment for at least 1 hour.

The gettering particles 108/320 are oriented as discussed above during fabrication of the barrier layer. In one example, the orientation of gettering particles 108/320 can be achieved by applying a force to the slurry after the slurry is deposited on to the substrate 104 but while the slurry is in an uncured or partially cured state (e.g., the green state). The force can be applied in a direction perpendicular to the surface of the substrate 104, by a press, for example. The application of the force can be paired with either heating or cooling the slurry. In another example, the orientation of gettering particles 108/320 can be achieved by rapidly freezing the slurry after the slurry is deposited on to the substrate 104 but while the slurry is in an uncured or partially cured state (e.g., the green state).

In another example, a tape casting process is used to fabricate the barrier layer. The slurry includes a binding agent and is formed into flexible tapes by partially curing the slurry into thin, flat sheets. The partial curing can include drying to the green state, as discussed above. During the formation of the flexible tapes, the gettering particles 108/320 are oriented by any of the methods discussed above. The binding agent facilitates the formation of tapes and provides adhesive properties to the tapes so that the tapes can be arranged on the substrate 104. The slurry is then sintered as discussed above. The binding agent is removed from the slurry during the sintering.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article comprising:
   a ceramic-based substrate; and
   a barrier layer on the ceramic-based substrate, the barrier layer including:
   a matrix phase,
   gettering particles in the matrix phase, the gettering particles being reactive with respect to oxidant particles and including at least one of silicon oxycarbide (SiOC) particles, silicon carbide (SiC) particles, silicon nitride ($Si_3N_4$) particles, silicon oxycarbonitride (SiOCN) particles, silicon aluminum oxynitride (SiAlON) particles, and silicon boron oxycarbonitride (SiBOCN) particles, wherein at least 50% of the gettering particles have an aspect ratio greater than one, and wherein the gettering particles with an aspect ratio greater than one are aligned such that a maximum dimension of the gettering particles extends along an axis that is generally parallel to the substrate, and
   a dispersion of diffusive particles in the matrix phase.

2. The article as recited in claim 1, wherein the diffusive particles include at least one of barium-magnesium alumino-silicate particles, barium strontium alumino-silicate particles, magnesium silicate particles, alkaline earth alumino-silicate particles, yttrium alumino-silicate particles, ytterbium alumino-silicate particles, and other rare earth metal alumino-silicate particles.

3. The article as recited in claim 1, wherein the gettering particles are silicon oxycarbide particles, and the diffusive particles are barium-magnesium alumino-silicate particles.

4. The article as recited in claim 3, wherein the barium-magnesium alumino-silicate particles have an average maximum dimension that is smaller than an average maximum dimension of the silicon oxycarbide particles.

5. The article as recited in claim 1, wherein at least 25% of the gettering particles have an aspect ratio greater than three.

6. The article as recited in claim 1, further comprising a distinct intermediate layer between the barrier layer and the ceramic-based substrate, the distinct intermediate layer including an intermediate layer matrix and a dispersion of intermediate layer gettering particles in the intermediate layer matrix.

7. The article as recited in claim 1, further comprising a ceramic-based top coat on the barrier layer.

8. A composite material comprising:
a matrix of $SiO_2$;
a dispersion of gettering particles in the matrix, the gettering particles being reactive with respect to oxidant particles and including at least one of silicon oxycarbide (SiOC) particles, silicon carbide (SiC) particles, silicon nitride ($Si_3N_4$) particles, silicon oxycarbonitride (SiOCN) particles, silicon aluminum oxynitride (SiAlON) particles, and silicon boron oxycarbonitride (SiBOCN) particles and wherein at least 50% of the gettering particles have an aspect ratio greater than one and at least 25% of the gettering particles have an aspect ratio greater than three; and
a dispersion of diffusive particles in the matrix.

9. The composite material as recited in claim 8, wherein the diffusive particles include at least one of barium-magnesium alumino-silicate particles, barium strontium aluminum silicate particles, magnesium silicate particles, alkaline earth aluminum silicate particles, yttrium aluminum silicate particles, ytterbium aluminum silicate particles, and other rare earth metal aluminum silicate particles.

10. The composite material as recited in claim 8, wherein the gettering particles are silicon oxycarbide particles and the diffusive particles are barium-magnesium alumino-silicate particles.

11. The composite material as recited in claim 9, wherein the gettering particles with an aspect ratio greater than one are aligned such that a maximum dimension of the gettering particles extends along an axis that is generally perpendicular to a thickness dimension of the composite material.

12. The article as recited in claim 1, wherein an average aspect ratio of the gettering particles is between about 2 and 5.

13. The article as recited in claim 1, wherein an average maximum dimension of the gettering particles is between about 30 and 70 microns.

14. The article as recited in claim 6, wherein an average maximum dimension of the intermediate layer gettering particles is less than an average maximum dimension of the barrier layer gettering particles.

15. The composite material as recited in claim 8, wherein an average aspect ratio of the gettering particles is between about 2 and 5.

16. The composite material as recited in claim 8, wherein an average maximum dimension of the gettering particles is between about 30 and 70 microns.

* * * * *